(12) United States Patent
Lamkin

(10) Patent No.: US 7,264,759 B2
(45) Date of Patent: Sep. 4, 2007

(54) COMPRESSION MOLDING PROCESS FOR GRIP FOR SPORT IMPLEMENT

(75) Inventor: Robert E Lamkin, Bonita, CA (US)

(73) Assignee: Lamkin Corporation, San Diego, CA (US)

(*) Notice: Subject to any disclaimer, the term of this patent is extended or adjusted under 35 U.S.C. 154(b) by 389 days.

(21) Appl. No.: 09/969,076

(22) Filed: Oct. 1, 2001

(65) Prior Publication Data

US 2003/0062654 A1    Apr. 3, 2003

(51) Int. Cl.
    *B29C 43/18*    (2006.01)
(52) U.S. Cl. .............. 264/248; 264/250; 264/275; 264/325
(58) Field of Classification Search ........... 264/250, 264/263, 266, 275
    See application file for complete search history.

(56) References Cited

U.S. PATENT DOCUMENTS

| | | |
|---|---|---|
| 1,523,638 A | 1/1925 | Freedlander et al. |
| 1,536,288 A | 5/1925 | Freedlander et al. |
| 1,768,933 A | 7/1930 | Riley |
| 2,103,889 A | 12/1937 | Brisick ............. 273/81 |
| 2,221,421 A | 11/1940 | Curry ............. 273/81 |
| 2,357,491 A | 9/1944 | Park ............. 273/80 |
| 2,583,198 A | 1/1952 | Axton, Jr. ............. 273/75 |
| 2,604,660 A | 7/1952 | Karns ............. 18/36 |
| 2,604,661 A | 7/1952 | Karns ............. 18/36 |
| 2,704,668 A | 3/1955 | Park, Sr. ............. 273/81 |
| 3,090,999 A | 5/1963 | Karns ............. 18/59 |
| 3,374,503 A | 3/1968 | Boniger ............. 18/36 |
| 3,606,326 A | 9/1971 | Sparks et al. ............. 273/81 R |
| 4,261,567 A | 4/1981 | Uffindell ............. 273/81 R |
| 4,338,270 A | 7/1982 | Uffindell ............. 264/46.4 |
| 4,819,939 A | 4/1989 | Kobayashi ............. 273/81 R |
| 4,919,420 A | 4/1990 | Sato ............. 273/81 B |
| 5,261,665 A * | 11/1993 | Downey ............. 473/303 |
| 5,322,290 A | 6/1994 | Minami ............. 273/187.5 |
| 5,571,050 A * | 11/1996 | Huang ............. 473/300 |
| 5,730,669 A | 3/1998 | Huang ............. 473/549 |
| 5,797,813 A | 8/1998 | Huang ............. 473/549 |
| 5,816,934 A | 10/1998 | Huang ............. 473/301 |
| 5,857,929 A | 1/1999 | Huang ............. 473/549 |
| 5,895,329 A | 4/1999 | Huang ............. 473/302 |
| 5,906,548 A | 5/1999 | Hadge ............. 473/206 |
| 5,910,054 A | 6/1999 | Huang ............. 473/302 |
| 6,425,836 B1 * | 7/2002 | Misono et al. ............. 473/567 |

FOREIGN PATENT DOCUMENTS

JP    06246022 A *    9/1994

* cited by examiner

*Primary Examiner*—Edmund H. Lee
(74) *Attorney, Agent, or Firm*—Dorsey & Whitney LLP

(57) ABSTRACT

A grip for a sporting implement is formed of two rubber materials having different durometer rating and formed in a compression molded process. An underlisting is injection molded from one relatively hard rubber material providing desired torsional resistance and then an outer rubber layer is compression molded to the underlisting with the outer layer being having a durometer rating for providing desired tactile characteristics to the grip.

15 Claims, 8 Drawing Sheets

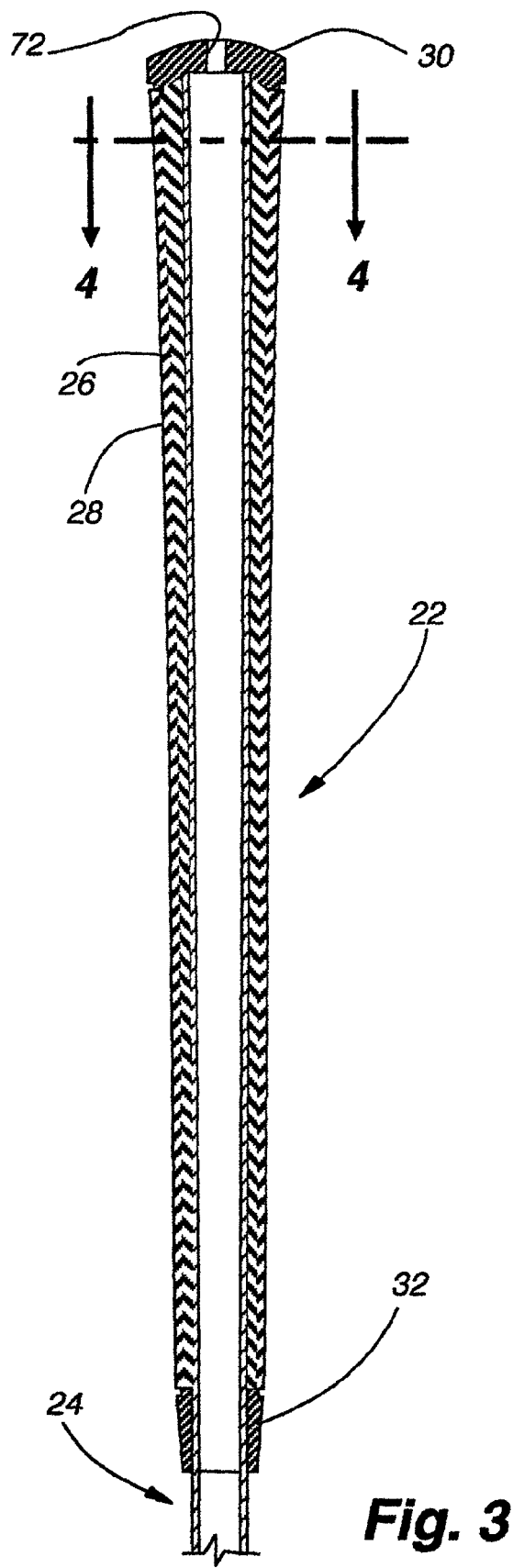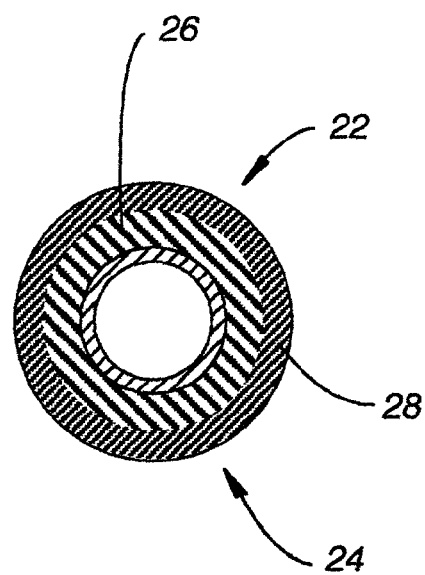
Fig. 3
Fig. 4

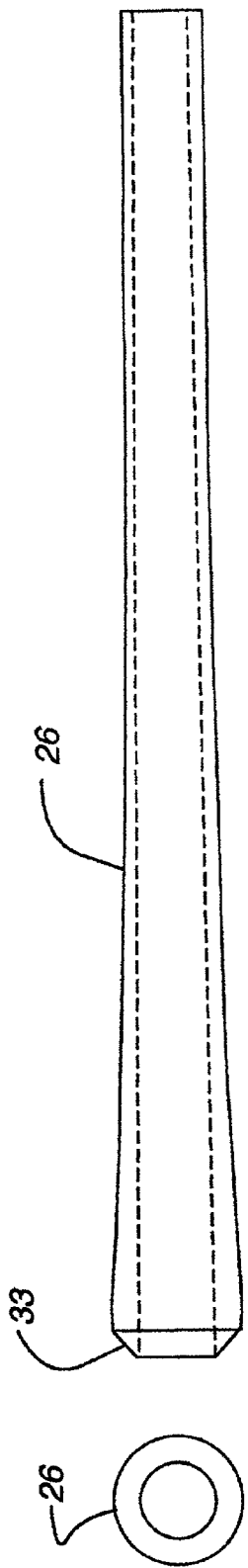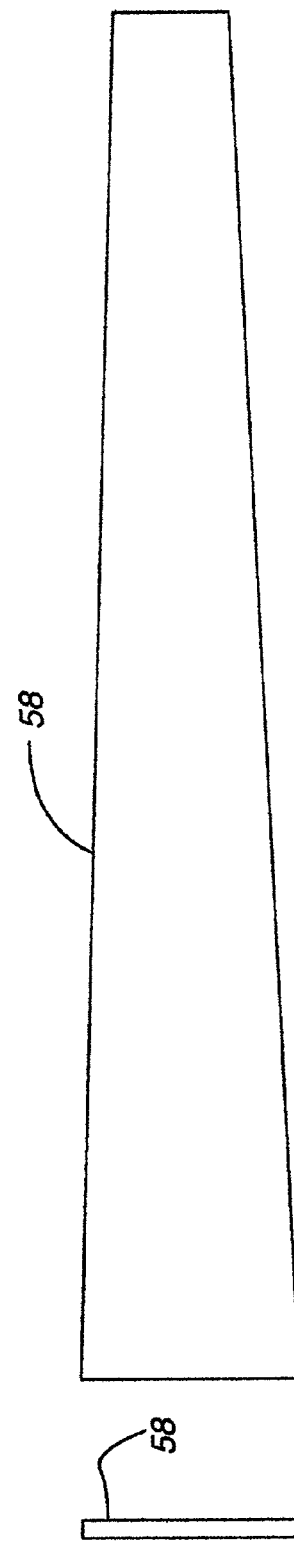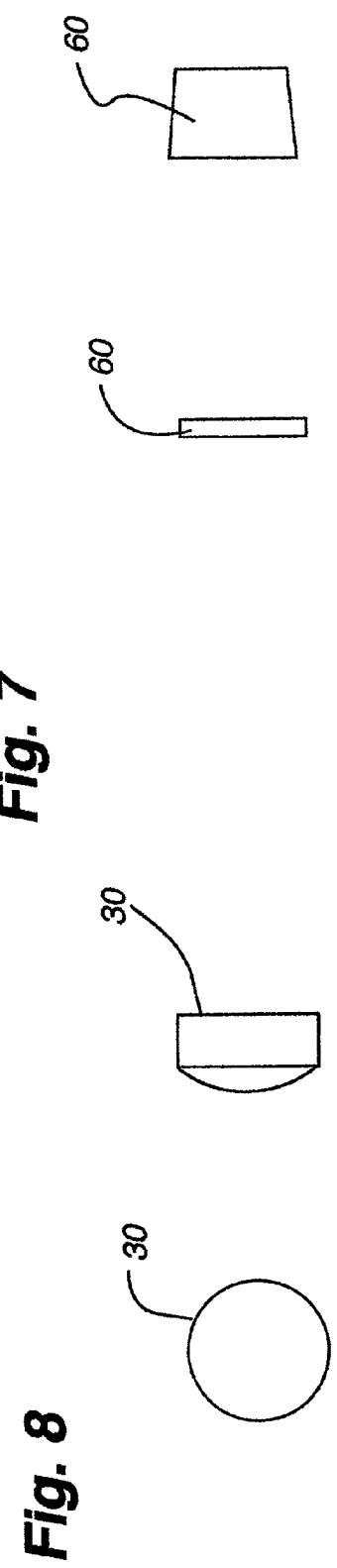

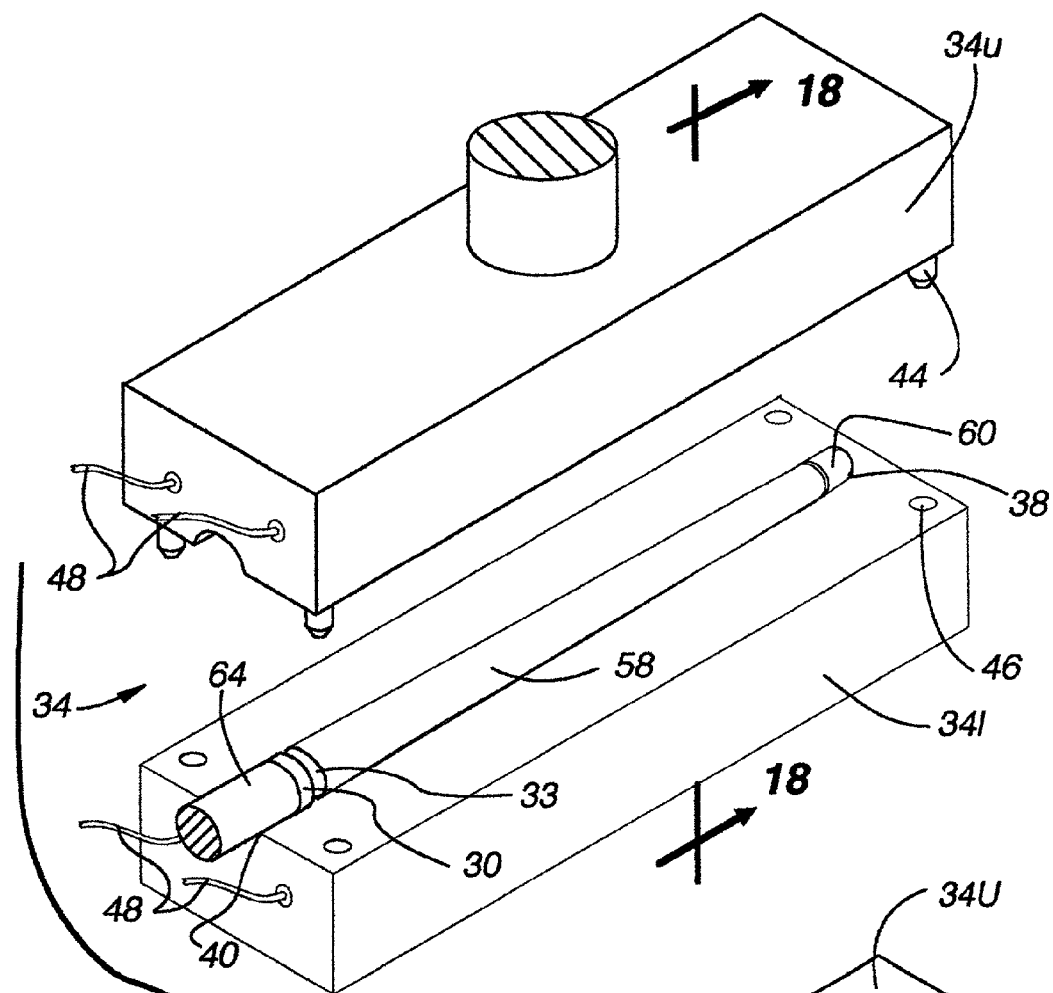
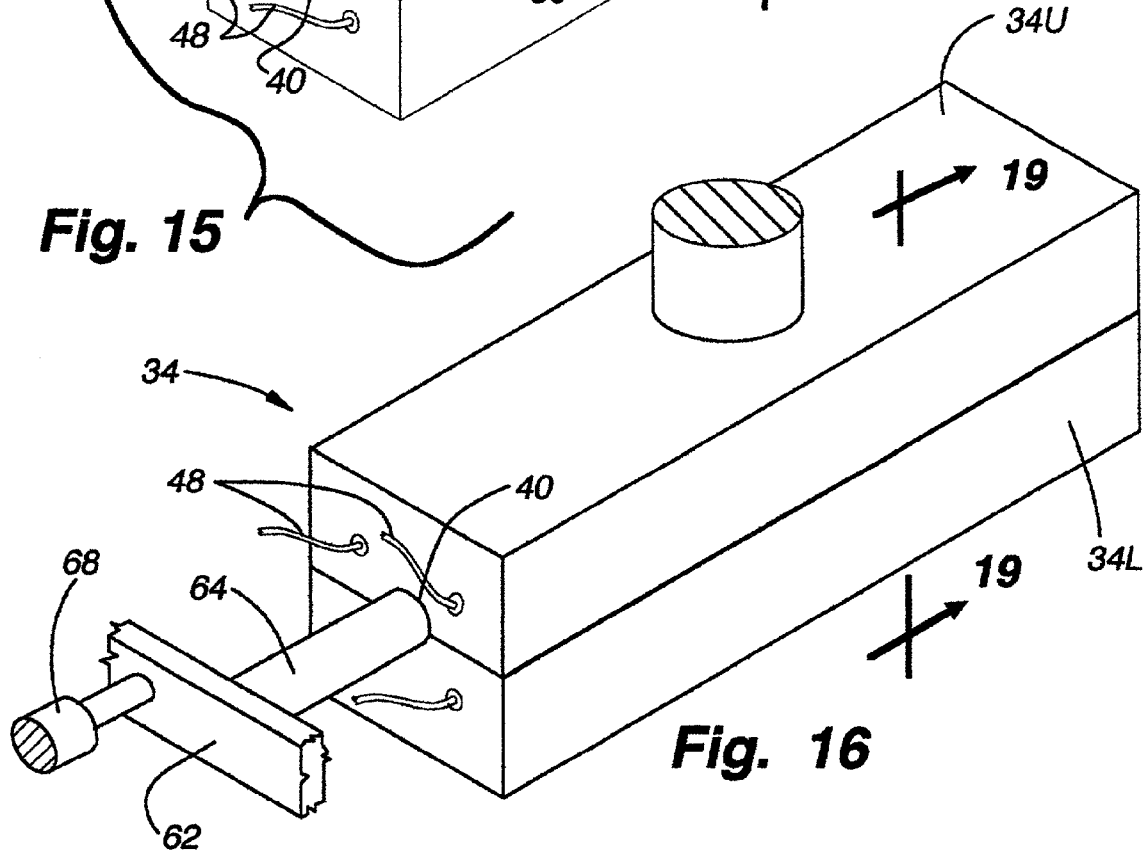
Fig. 15
Fig. 16

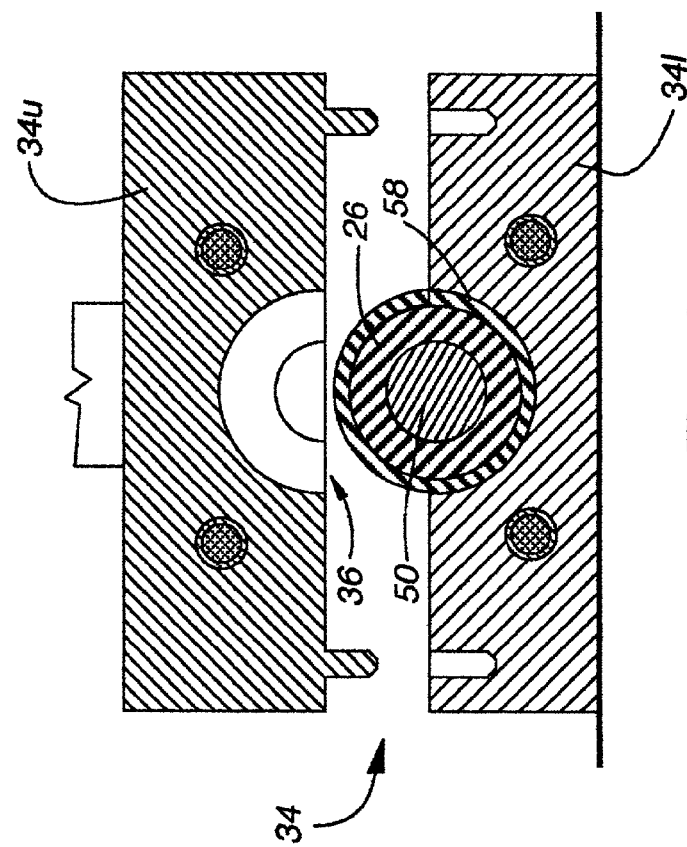
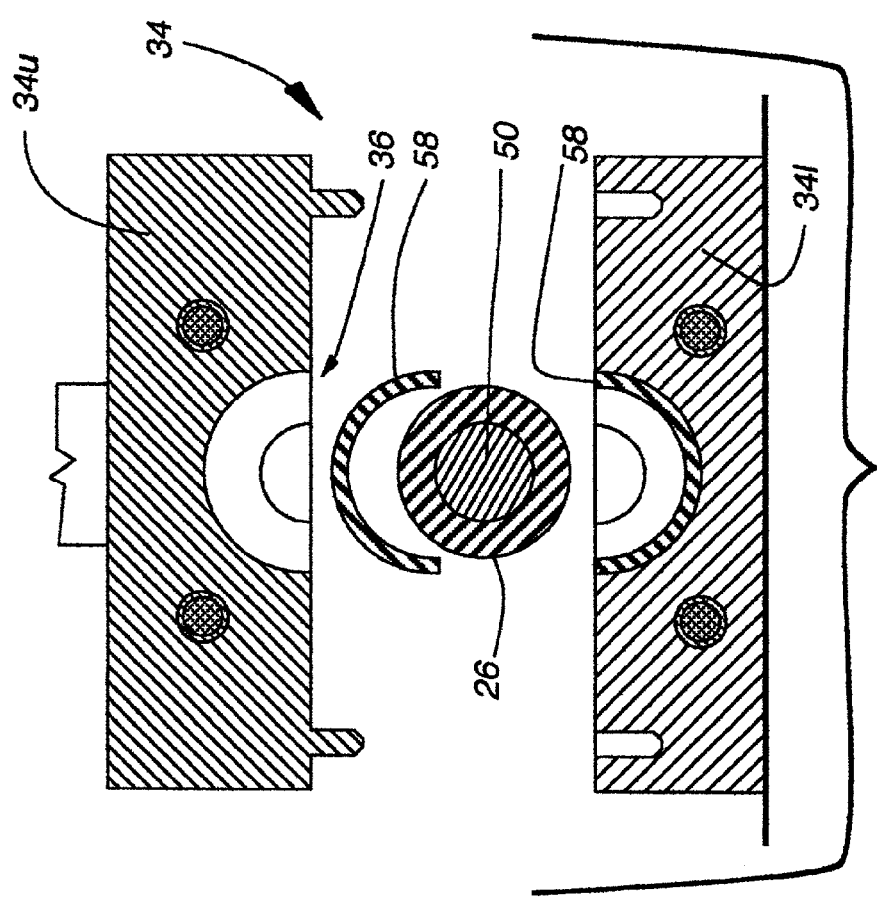

COMPRESSION MOLDING PROCESS FOR GRIP FOR SPORT IMPLEMENT

BACKGROUND OF THE INVENTION

1. Field of the Invention

A grip for a sporting implement is made from a compression molding process wherein an injection molded rubber underlisting is positioned in a compression mold and other grip components of rubber material are laid thereacross and around so that the components can be compression molded and vulcanized to the underlying underlisting.

2. Description of Relevant Art

Grips for sporting implements have taken numerous forms for many years with early grips for golf clubs, tennis rackets and the like simply consisting of a wrap of material, such as leather, in a helical or spiral pattern around a handle portion of the sporting implement. In recent years, the leather material has been replaced in some circumstances with polyurethane and rather then wrapping the polyurethane or leather strip of material directly onto the handle portion of the sporting implement, sometimes an elastomeric tubular underlisting is first mounted on the handle portion of the implement so the strip leather or polyurethane material can be wrapped onto the underlisting.

In the sport of golf, grips have evolved from the wrap type grip described above to vulcanized rubber sleeves that are simply slipped over the butt end of the golf club. Such grips are still in use and typically made of one uniform rubber material. To improve the frictional gripping quality of the grip for the user of the club, a pattern is frequently molded into the outer surface of the grip. Since the grip on a golf club and other sporting implements must have a desired degree of torsional resistance, the rubber material from which the grips are made must be relatively hard which is sometimes undesirable from the aspect of obtaining the desired friction between the grip and the user's hands. Further, hard rubber materials tend to become harder and slippery over time and with repeated use.

Accordingly, grips made of more than one rubber material or even thermoplastic materials have recently come into existence. An example of such a grip is disclosed in copending application Ser. No. 09/779,029 entitled "Grip For Sporting Implement" which is of common ownership with the present application. In the pending application, an underlisting of a relatively hard rubber material is provided with a recess in its outer surface in which a tubular sleeve of a softer material is positioned. This combination provides the torsional resistant base desired for the grip with a relatively soft rubber gripping surface desired by some users.

U.S. Pat. No. 3,090,999 to Karns, U.S. Pat. No. 5,322,290 to Minami and U.S. Pat. No. 5,261,665 to Downey are other illustrations of grips having multiple layers of material with the layers being made of materials of varying hardness.

It is also known in the art to mold one layer of material onto another layer of material in a grip for a sporting implement with the aforenoted Downey patent being an example of such. In the grip disclosed in the Downey patent, an inner socket is formed of a thermoplastic material and an outer jacket is also formed of a thermoplastic material with the outer jacket being injection molded onto the inner socket. Thermoplastic materials are not always desirable for grips, however, and rubber materials are difficult if not impossible to injection mold to each other.

Accordingly, while it is desirable in many instances to have a grip formed from materials of varying hardness, it is difficult to mold such materials together if they are rubber as opposed to thermoplastic in nature.

It is to overcome the shortcomings of the prior art and to provide a new grip and method of making the grip in a molding process that the present invention has been developed.

SUMMARY OF THE INVENTION

The present invention relates to a grip for a sporting implement made of rubber materials having different durometer ratings wherein an outer layer of the grip is compression molded to an inner tubular base member. In such an arrangement, the base member which is preferably of a harder material provides the desired torsional resistance for the grip while the outer softer material provides a more desirable surface for griping by a user of the grip.

The grip is made in accordance with a method wherein the inner tubular base member or underlisting is injection molded from rubber and then placed in a heated compression mold with strips of a relatively soft rubber material laid in overlying relationship therewith. The mold is subsequently closed and heated under pressure so that the strips of relatively soft rubber material are vulcanized to the tubular underlisting. Also during the compression molding process, an end cap can be placed in the mold in abutting relationship with a butt end of the tubular underlisting and tabs of a different or the same rubber material as the underlisting can be placed in adjacent contiguous relationship with the opposite or tip end of the underlisting. In this manner, after the completion of the compression molding process, the end cap is vulcanized to the butt end of the underlisting, the strips of relatively soft material are vulcanized in circumferentially surrounding relationship with the underlisting and the tabs of material form an integral cylindrical flap or skirt at the tip end of the grip to facilitate the ease of placement of the grip onto the butt end of a golf club shaft or the like. To support the underlisting during the compression molding process a mandrel can be placed in the hollow center of the underlisting.

Other aspects, features and details of the present invention can be more completely understood by reference to the following detailed description of a preferred embodiment, taken in conjunction with the drawings and from the appended claims.

BRIEF DESCRIPTION OF THE DRAWINGS

FIG. 3 is a section taken along line 3-3 of FIG. 2.

FIG. 4 is an enlarged section taken along line 4-4 of FIG. 3

FIG. 5 is a side elevation of the underlisting forming part of the grip of the present invention.

FIG. 6 is an end view of the underlisting shown in FIG. 5 forming part of the grip of the present invention.

FIG. 7 is a top plan view of a strip of material used in the grip of the present invention.

FIG. 8 is an end elevation of the strip shown in FIG. 7.

FIG. 9 is an end elevation of the end cap used in the grip of the present invention.

FIG. 10 is a side elevation of the end cap shown in FIG. 9.

FIG. 11 is a plan view of a tab of material used to form the skirt of the grip of the present invention.

FIG. 12 is an edge view of the tab shown in FIG. 11.

FIG. 15 is an isometric view similar to FIG. 14 showing the underlisting with the mandrel therein having been placed in the lower half of the mold with the second strip of material and tab having been laid over the underlisting and the plunger inserted into the mandrel.

FIG. 16 is an isometric view similar to FIG. 15 with the mold halves having been placed in closed confronting relationship.

FIG. 17 is a section taken along line 17-17 of FIG. 14.

FIG. 18 is a section taken along line 18-18 of FIG. 15.

DESCRIPTION OF THE PREFERRED EMBODIMENT

Figure 1:
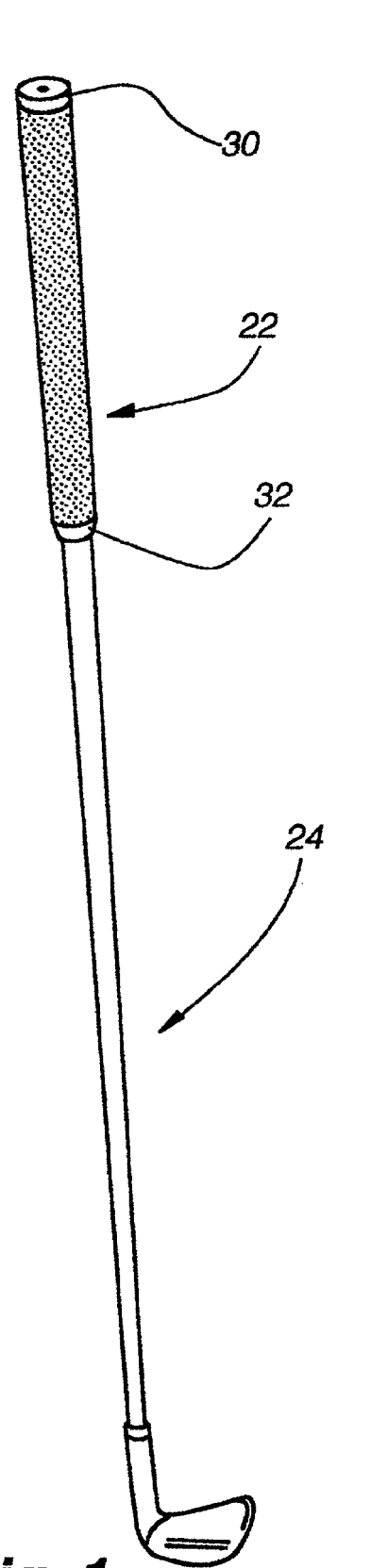
FIG. 1 is an isometric view of a golf club having the compression molded grip of the present invention mounted thereon.
Figure 2:
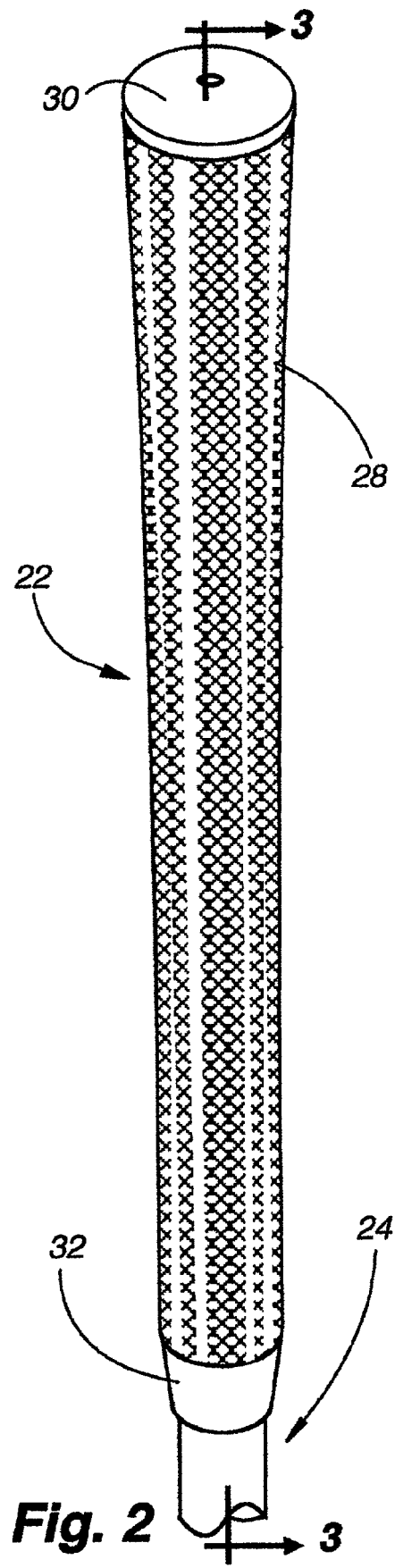
FIG. 2 is an enlarged fragmentary isometric view of the grip portion of the golf club shown in FIG. 1.

A grip 22 for a sporting implement is described hereafter in connection with a golf club 24, it being understood that the grip and the method of manufacturing the grip could be utilized in connection with other sporting implements such as tennis rackets and the like. As possibly best appreciated in FIG. 3, the grip 22 includes a tubular base member or underlisting 26 with an outer circumferential layer 28 of a relatively soft material that has been compression molded and vulcanized to the underlisting. An end cap 30 is compression molded and vulcanized to the butt end 26b of the underlisting and a flexible collar or skirt 32 is compression molded and vulcanized to the tip end 26t of the underlisting.

The underlisting can be of conventional generally frustoconical configuration so as to taper in a converging manner from the butt end to the tip end thereof and is made of rubber. The rubber could be of any desired hardness but preferably has a durometer rating in the range of 55 to 60 so that the underlisting is hard enough to provide the torsional resistance desired for a golf grip. The butt end 26b of the underlisting has a beveled outer surface 33 to provide optimal joinder with the end cap during the molding process. The hollow interior of the underlisting is also of generally frustoconical configuration so as to generally conform with the taper of a golf club shaft and the underlisting is adapted to be slid over the butt end of the golf club shaft until the end cap abuts the butt end of the golf club shaft which properly positions the grip on the shaft. While the underlisting can be fabricated in any acceptable manner, conventional injection molding thereof has proven desirable.

The outer relatively soft layer 28 of the grip 22 is formed from at least one part and preferably two component parts in a manner to be described later which are integrated together during the compression molding process along the major length of the grip from the butt end to a location close to the tip end of the grip. The soft rubber material in the outer layer 28 could be any desired softness but preferably has a durometer rating in the range of 35-40. The skirt 32 at the tip end of the underlisting is made of any desirable rubber material but could be the same as the material from which the underlisting 26 is made and such that the skirt is flexible enough to facilitate an easy mounting of the grip on the butt end of a golf club shaft.

The grip is formed in a compression molding process which is best shown in FIGS. 14-20. The mold 34 in which the process is carried out includes a lower mold half 34L and an upper mold half 34U with each of the mold halves having a cavity 36 formed in a confronting face thereof to receive component parts of the grip for molding purposes. The cavities are closed at one end 38 of the associated mold half and open axially at the opposite end 40 of the mold half. The cavities may have a pattern 42 formed in a portion of the wall thereof so that the outer surface of the grip is formed with that same pattern and with the pattern typically being designed to facilitate improved gripping of the golf club. The upper mold half 34U has four guide pins 44 at its opposite corners while the lower mold half 34L has four mating guide recesses 46 so that the mold halves can be properly aligned for molding purposes. Electrical wires 48 are also provided for resistive heating of the mold halves so that the component rubber parts of the grip during the compression molding process are vulcanized into a unified grip of two distinct layers.

As best seen in FIGS. 13-20, to assemble the component parts of the grip for the molding process, an elongated incompressible mandrel 50 having a generally cylindrical main body 52 and a centering axial recess 54 at a butt end 52b of the main body is inserted into the hollow interior of the previously molded underlisting 26.

Figure 13:
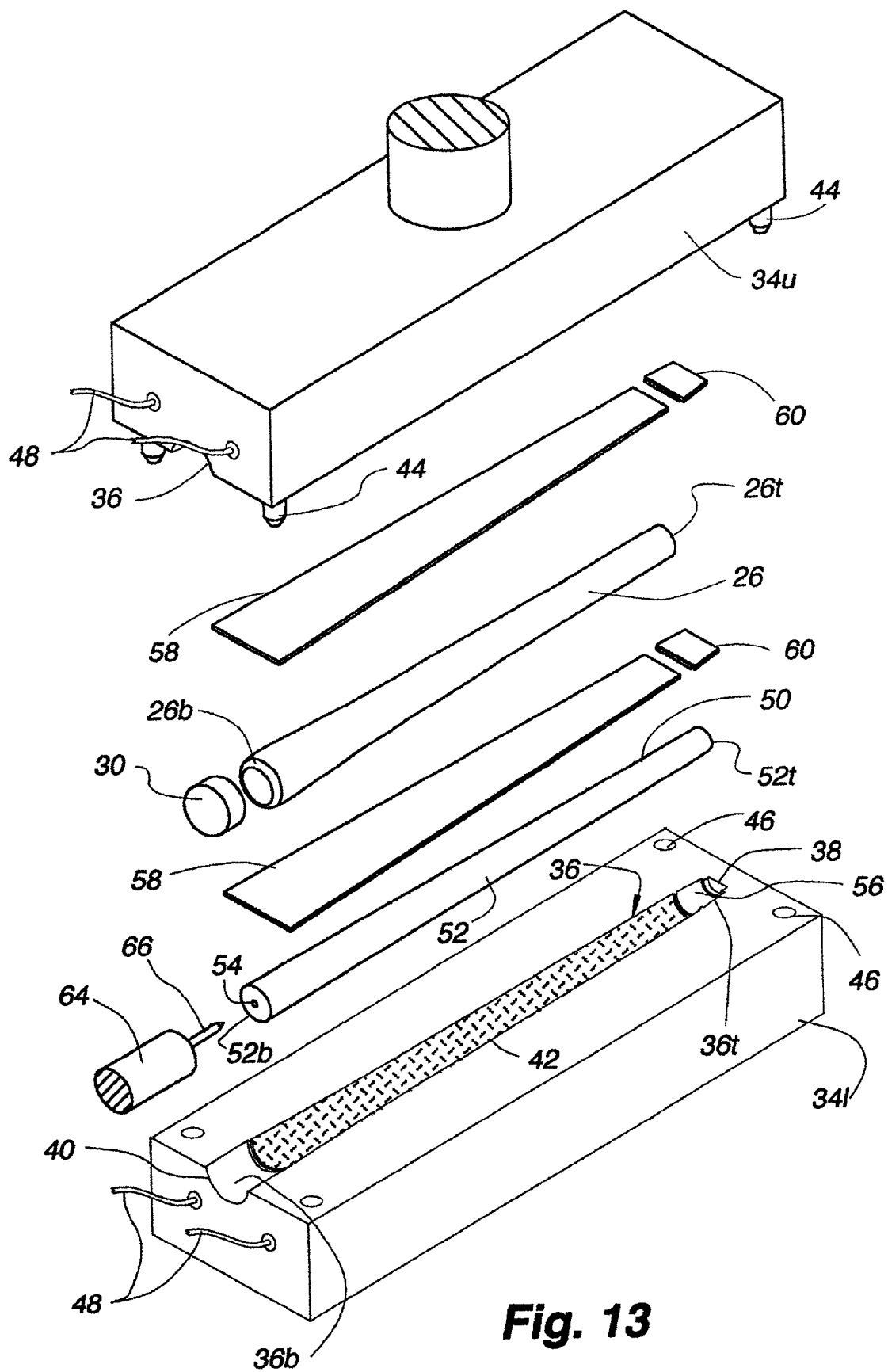
FIG. 13 is an exploded isometric view showing the various component parts of the grip of the present invention and the compression mold parts used to form the grip of the present invention.
Figure 14:
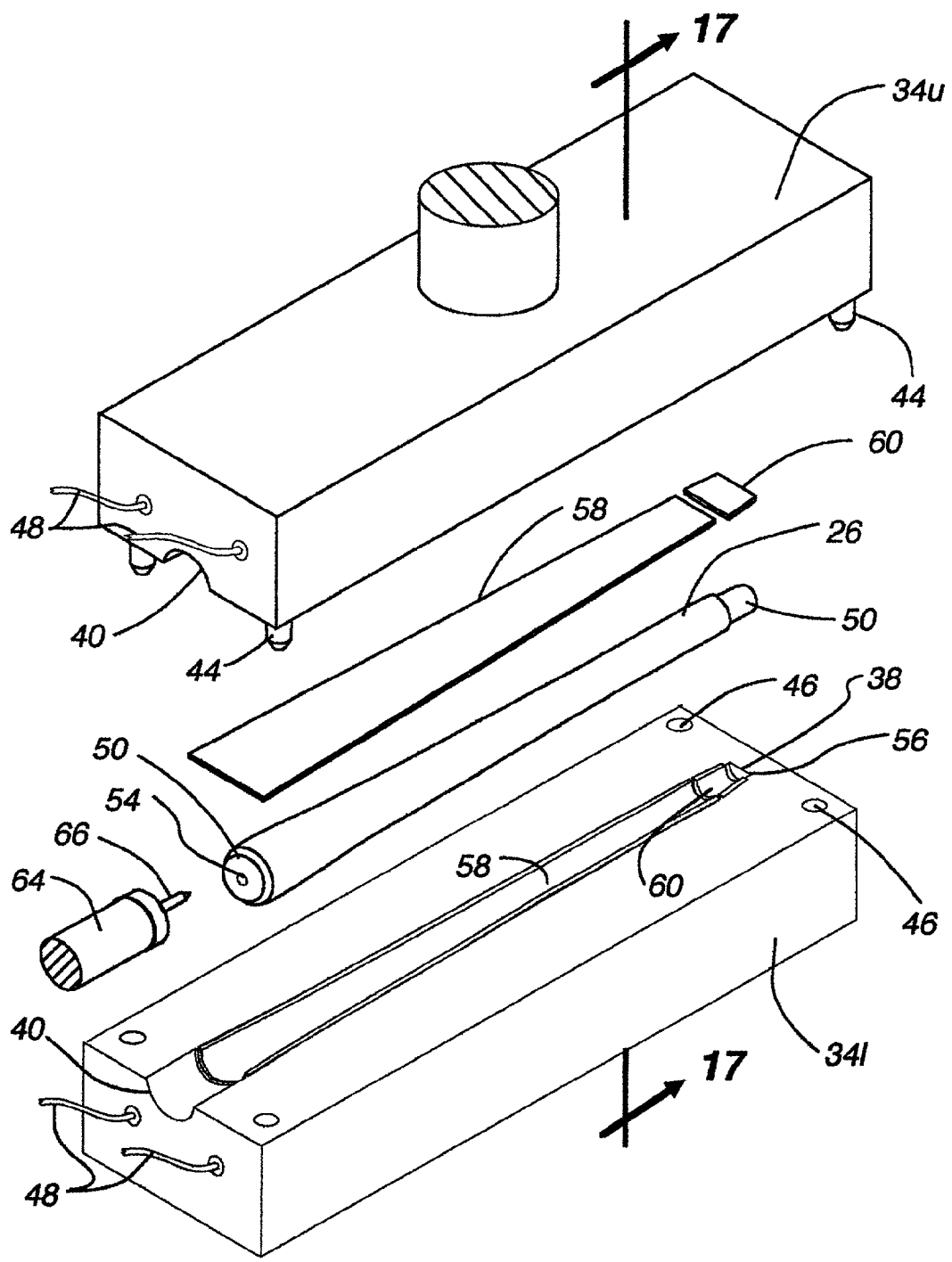
FIG. 14 is an exploded isometric view with the mold halves separated and with a strip material and tab material having been placed in one half of the compression mold, the underlisting for the grip mounted on a mandrel prior to being placed in the mold, the end cap mounted on the plunger, and a second strip material and tab material superimposed over the underlisting for placement thereon.
Figure 20:
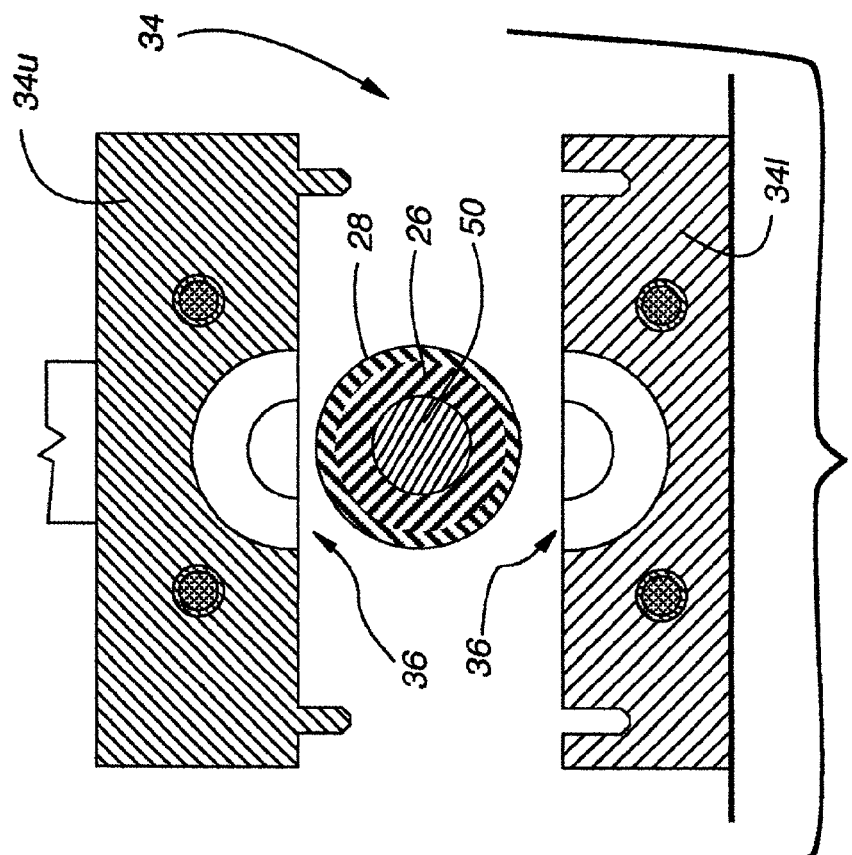
FIG. 20 is a vertical section taken through the mold with the halves of the mold having been separated and the completed grip being positioned therebetween.

The butt end 52b of the main body of the mandrel is positioned in transverse alignment with the butt end 26b of the underlisting. The tip end 52t of the main body projects a short distance beyond the tip end 26t of the underlisting so that it can rest in an arcuate cradle defined by an arcuate surface 56 in each mold half at the closed end of the mold. Before placing the underlisting 26 with the mandrel 50 therein into the lower mold half 34L, an elongated strip 58 of the soft rubber strip material forming the outer layer 28, as best seen in FIGS. 7, 8 and 13, is laid into the cavity 36 in the lower mold half. The strip 58 is of generally trapezoidal configuration and has a width that is approximately half the circumference of the underlisting at each location along the length of the underlisting. A separate rubber tab 60 as best seen in FIGS. 11-13, also of trapezoidal configuration for forming a portion of the collar or skirt 32 at the tip end of the grip, is also positioned in the cavity in the lower mold at a tip end thereof and in longitudinal alignment with the elongated strip 58 adjacent to the arcuate surface 56. The elongated strip extends from a location spaced inwardly from the butt end 36b of the cavity 36 to a location near the tip end 36t of the cavity. The tab 60 is positioned in the mold half between the tip end of the elongated strip and the arcuate surface 56. The tab, which preferably has a durometer rating of about 55, has a width that is approximately equivalent to one half the circumference of the tip end 26t of the underlisting. The underlisting with the mandrel therein is then placed in the cavity on the elongated strip 58 and the tab 60.

The open end of the mold 34 is in alignment with a cap bar 62 (FIGS. 13 and 16) that supports a cylindrical arm 64 having a cupped distal end with a pin 66 with a sharpened tip protruding axially therefrom and toward the cavities 36 formed in the mold halves. The cap bar 62 is mounted on a reciprocating plunger 68 and adapted to be moved toward and away from the mold such that the cylindrical arm 64 can be moved into the cylindrical opening 54 in the open end of the mold defined by the cavities in the mold halves until the sharpened pin 66 is received in the axial recess 54 of the mandrel 50. The cylindrical arm 64 of course is reciprocally mounted so as to be moveable into the open end of the mold and removable therefrom.

The end cap 30 is simply a solid disc of hard rubber (FIGS. 9, 10 and 13) having a durometer rating preferably in the range of 70-75. The end cap is positioned on the pin 66 (FIG. 14) adjacent to the butt end of the cavities. The pin is advanced through the axial center of the end cap so as to puncture an axial hole in the end cap which becomes a vent hole 72 in the finished grip. A second elongated trapezoidal strip 58 is then placed over the top of the underlisting 26 in vertical alignment with the first trapezoidal strip 58 and a second tab 60 of rubber material is placed on top of the exposed mandrel in vertical alignment with the first placed tab 60 of material.

Figure 19:
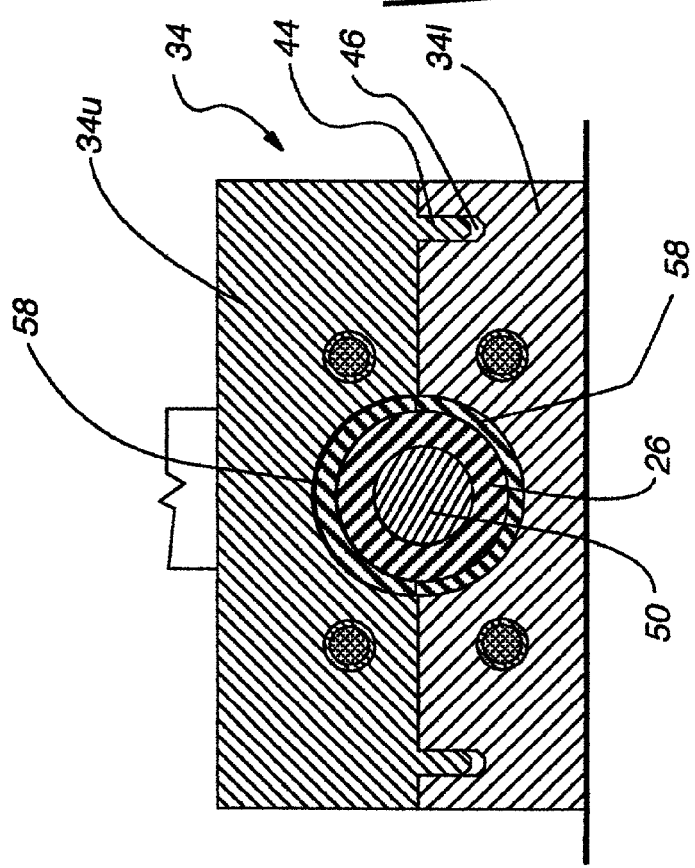
FIG. 19 is a section taken through the closed mold with the components therein.

With the components of the grip thereby positioned on or within the lower mold half 34L (FIGS. 15 and 18), the upper mold half 34U is advanced downwardly into compressive relationship with the grip components with the guide pins 44 being received in the guide recesses 46 and with the grip components laid out in the lower mold half extending into the cavity in the upper mold half (FIGS. 16 and 19). The cylindrical arm 64 is advanced axially into the cylindrical opening 54 in the open end of the mold before or after it is closed (FIGS. 15 and 16) so that the sharpened pin 66 is received in the axial recess 54 of the mandrel and the end cap 30 is abutting the butt end of the underlisting. Thereafter, heat is applied to the mold. The heat is sufficient to vulcanize the various rubber components into an integrated unit under compression and after the vulcanization process, which lasts for a period of time that would be well known to those in the art, the upper half of the mold is lifted from the lower half (FIG. 20) and the cylindrical arm 64 is withdrawn leaving the end cap 30 vulcanized to the butt end 26b of the underlisting. The grip with the mandrel 50 therein is thereafter removed from the lower half of the mold and finally the mandrel is withdrawn through the open tip end of the grip leaving the completed compression molded grip. Any excesses or flashing resulting from the molding process can be trimmed in a well known manner.

The resulting grip 22 can be appreciated to include an injection molded underlisting 26 of rubber having predetermined and desired torsional resistance and an outer uniform covering 28 of a relatively soft rubber material providing desired tactile characteristics extending over the full length of the underlisting. At the butt end of the underlisting, the end cap 30, with the vent hole 72 therethrough, is vulcanized to the end of the underlisting so as to overlay the end of the golf club shaft when the grip is mounted thereon. At the tip end of the grip the rubber collar or skirt 32 is also vulcanized to the associated end of the underlisting so that the grip is relatively easy to position over the butt end of a golf club shaft when mounting the grip in a conventional manner on the shaft. Of course, the collar also becomes integrated with or vulcanized to the elongated rubber strips 58 forming the outer covering 28 of the grip during the compression molding process.

By forming the grip 22 with the compression molding process described, the underlisting 26 can be made of one rubber material and the outer covering 28 of another rubber material which has not, to applicant's knowledge, been possible with molding processes formerly used in the formation of grips for sporting implements. The use of rubber, of course, as opposed to thermoplastics or the like provides a distinct tactile feel to the grip which to many golfers is superior to that provided by thermoplastic materials. In addition, the soft rubber covering can be made of a different material or color than the collar to give the grip a distinct look and various gripping patterns can be molded into the soft rubber cover as desired.

Although the present invention has been described with a certain degree of particularity, it is understood the present disclosure has been made by way of example, and changes in detail or structure may be made without departing from the spirit of the invention as defined in the appended claims.

What is claimed is:

1. A method of making a grip for a sporting implement comprising the steps of: providing a tubular elastomeric base member of substantially the full length of the grip, providing a compression mold, providing at least one strip of an elastomeric material of substantially the full length of the grip but of a different hardness than said base member, placing said strip material in overlying engaging relationship with said base member in said mold, and then compression molding the placed strip material to said base member under heat to vulcanize the strip material to the base member.

2. The method of claim 1 wherein said strip material is at least two strips of material placed on opposite sides of said base member in said mold.

3. The method of claim 2 wherein said strips of material have a width and the aggregate width of said strips of material is substantially the same as the circumference of said tubular base member so as to completely surround said tubular base member when molded thereto.

4. The method of claim 3 further including the step of placing an end cap in said mold adjacent to and in longitudinal alignment with one end of said tubular base member, said end cap also being compression molded to said base member under heat so as to be vulcanized to said base member.

5. The method of claim 3 further including the step of placing a mandrel in said tubular member prior to compression molding said strips to said base member.

6. The method of claim 5 wherein said tubular base member is injection molded prior to placement of the base member into said compression mold.

7. The method of claim 2 wherein, the outer surface of said base member is frustoconical in configuration and the strip members are trapezoidal in configuration.

8. The method of claim 7 wherein there are only two of said strip members.

9. The method of claim 1 wherein said base member and strip material are rubber.

10. The method of claim 7 wherein said base member and strips of material are rubber.

11. The method of claim 10 wherein said base member has a higher durometer rating than said strips of material.

12. The method of claim 11 wherein the durometer rating of said base member is in the range of 55-60 and the durometer rating of said strip material is in the range of 35-40.

13. The method of claim 4 further including the step of placing tab material in contiguous alignment with said tubular base member at the opposite end from said end cap such that said tab material is vulcanized to said base member during the compression molding step.

14. The method of claim 13 wherein said tab material is rubber and of a different durometer rating than said strip material.

15. The method of claim 14 wherein there are a plurality of pieces of said tab material each having a width with the aggregate widths of said tab material being substantially the same as the circumference of said base member in the location where said tab material is placed on said base member.

* * * * *